United States Patent
Sanchez et al.

(10) Patent No.: US 11,983,046 B2
(45) Date of Patent: May 14, 2024

(54) TRANSLATING PIVOT HINGE

(71) Applicant: Dell Products L.P., Round Rock, TX (US)

(72) Inventors: Anthony J. Sanchez, Pflugerville, TX (US); Michael J. Pescetto, Round Rock, TX (US); Boris Draca, Round Rock, TX (US); Hsin-Chung Chang, New Taipei (TW); Jui-Hung Chang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/463,845

(22) Filed: Sep. 1, 2021

(65) Prior Publication Data
US 2023/0068228 A1 Mar. 2, 2023

(51) Int. Cl.
*G06F 1/16* (2006.01)
*E05D 3/12* (2006.01)
*E05D 11/10* (2006.01)

(52) U.S. Cl.
CPC ........... *G06F 1/1681* (2013.01); *E05D 3/122* (2013.01); *E05D 11/1028* (2013.01); *G06F 1/1618* (2013.01)

(58) Field of Classification Search
CPC ..... G06F 1/1681; G06F 1/1618; E05D 3/122; E05D 11/1028
See application file for complete search history.

(56) References Cited

U.S. PATENT DOCUMENTS

| | | | |
|---|---|---|---|
| 7,886,903 B1 | 2/2011 | Wurzelbacher, Jr. | |
| 7,975,348 B2 | 7/2011 | Lin | |
| 8,111,506 B2 * | 2/2012 | Wang | H04M 1/23 361/679.08 |
| 9,258,914 B2 * | 2/2016 | Koser | G06F 1/1633 |

(Continued)

FOREIGN PATENT DOCUMENTS

| | | |
|---|---|---|
| CN | 113015947 A | 6/2021 |
| CN | 113202857 A | 8/2021 |

(Continued)

OTHER PUBLICATIONS

U.S. Appl. No. 17/171,255, filed Feb. 9, 2021, entitled "Portable Information Handling System Hinge With Hybrid Rotation for Distributed Torque," by inventors Duck Soo Choi.

*Primary Examiner* — Anthony M Haughton
*Assistant Examiner* — Theron S Milliser
(74) *Attorney, Agent, or Firm* — ZAGORIN CAVE LLP; Robert W. Holland

(57) ABSTRACT

A portable information handling system pivots a hinge rotational axis as the hinge rotates housing portions between open and closed positions to manage a gap between the housing portions. For example, the hinge couples a base at a perimeter of one housing portion, the base having a many body that slides on sliding members of the base and that supports a bracket extending inward to couple to another housing portion. A bracket gear engages with a pinion gear included in the main body to translate bracket rotation through the pinion gear to a rack integrated in the base, thereby sliding the main body relative to the base as the housing portions rotate so that the distance between the housing portions adjusts with rotational orientation.

11 Claims, 7 Drawing Sheets

(56) References Cited

U.S. PATENT DOCUMENTS

| | | | |
|---|---|---|---|
| 9,632,529 B2 | 4/2017 | Tseng et al. | |
| 10,174,535 B2* | 1/2019 | Lin | G06F 1/1681 |
| 10,488,882 B2* | 11/2019 | Määttä | G06F 1/1616 |
| 10,606,321 B2* | 3/2020 | Wendt | E05D 11/06 |
| 10,642,309 B2* | 5/2020 | Cheng | E05D 7/00 |
| 10,725,505 B1 | 7/2020 | Hallar et al. | |
| 10,775,852 B2* | 9/2020 | Kim | G06F 1/1681 |
| 10,852,776 B1 | 12/2020 | Morrison et al. | |
| 11,042,198 B2* | 6/2021 | Jan | G06F 1/1618 |
| 11,061,445 B2* | 7/2021 | Kim | H05K 5/0226 |
| 11,340,663 B2* | 5/2022 | Kim | G06F 1/1616 |
| 11,396,766 B2* | 7/2022 | Lin | G06F 1/1681 |
| 11,467,633 B2* | 10/2022 | Liao | H04M 1/0216 |
| 11,474,569 B2* | 10/2022 | Huang | G06F 1/203 |
| 2010/0027224 A1* | 2/2010 | Wang | H04M 1/0237 |
| | | | 361/728 |
| 2015/0305185 A1* | 10/2015 | Koser | G06F 1/1633 |
| | | | 361/679.58 |
| 2018/0067520 A1* | 3/2018 | Määttä | G06F 1/1681 |
| 2018/0230724 A1* | 8/2018 | Lin | G06F 1/1616 |
| 2018/0373296 A1* | 12/2018 | Wendt | E05D 3/122 |
| 2019/0166703 A1* | 5/2019 | Kim | G06F 1/1652 |
| 2019/0317552 A1* | 10/2019 | Cheng | G06F 1/1681 |
| 2020/0371564 A1* | 11/2020 | Kim | G06F 1/1641 |
| 2021/0181808 A1* | 6/2021 | Liao | G06F 1/1652 |
| 2021/0255672 A1* | 8/2021 | Kim | G06F 1/1641 |
| 2021/0396056 A1* | 12/2021 | Lin | G06F 1/1681 |
| 2021/0405711 A1* | 12/2021 | Morrison | F16H 3/30 |
| 2022/0011827 A1* | 1/2022 | Kim | G06F 1/1681 |
| 2022/0221913 A1* | 7/2022 | Huang | G06F 1/1683 |
| 2022/0291724 A1* | 9/2022 | Kim | H04M 1/022 |

FOREIGN PATENT DOCUMENTS

| | | |
|---|---|---|
| TW | I707093 B | 10/2020 |
| TW | I713433 B | 12/2020 |
| TW | I721687 B | 3/2021 |

* cited by examiner

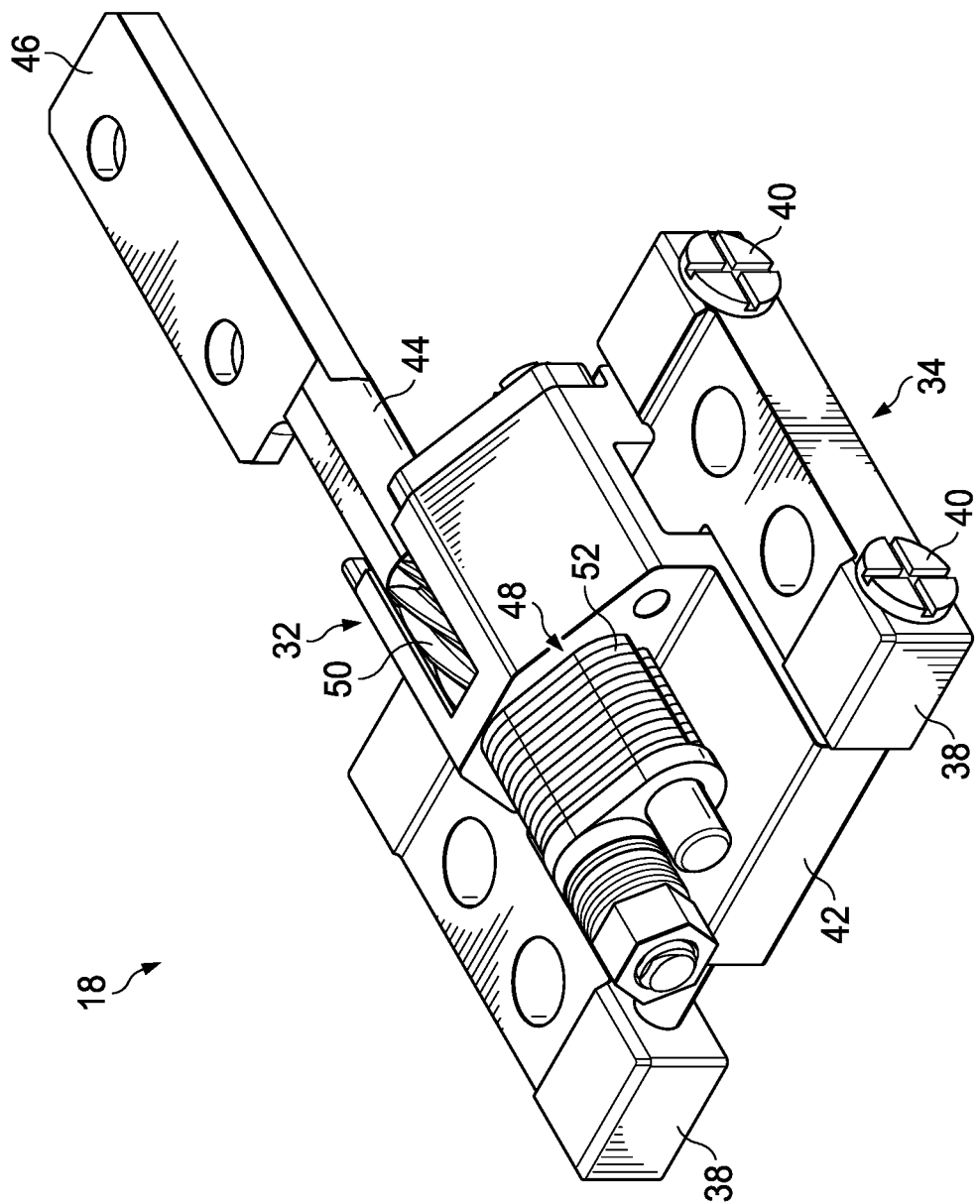

TRANSLATING PIVOT HINGE

BACKGROUND OF THE INVENTION

Field of the Invention

The present invention relates in general to the field of portable information handling system housing hinges, and more particularly to an information handling system translating pivot hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Portable information handling systems having a convertible configuration typically include multiple separate housing portions that rotationally couple to each other so that the system converts between closed and open positions. For example, a main housing portion integrates processing components and a keyboard and rotationally couples with hinges to a lid housing portion that integrates a display. In a clamshell position, the lid housing portion rotates approximately ninety degrees to a raised position above the main housing portion so that an end user can type inputs while viewing the display. After usage, convertible information handling systems rotate the lid housing portion to a closed position over the main housing portion to protect the keyboard and display, thus reducing the system footprint for improved storage and mobility.

One difficulty with convertible portable information handling systems is that the processing components in the main housing portion tend to generate thermal energy that can result in operating temperatures in excess of component constraints. Although a cooling fan that generates a cooling airflow can help to reduce housing interior temperatures, low profile housings tend to constrict airflow with a relatively high airflow impedance. One way to reduce airflow impedance is to use the full height of the housing to support airflow intake and/or exhaust by coupling the lid housing portion to rotate about an axis set forward from the rear of the main housing portion. The effect of this approach is to provide the entire height of the rear side of the housing to allow airflow through and to have the lid housing portion coupled with a seam that is visible from above the information handling system. One difficulty with the coupling of the lid housing portion at the main housing portion upper surface is that some amount of gap is generally needed along the seam between the main and lid housing portions to provide room for the lid housing portion to cleanly open and close as it rotates relative to the main housing portion. The amount of gap varies based upon housing dimensions and tends to increase with greater lid housing portion thickness.

SUMMARY OF THE INVENTION

Therefore, a need has arisen for a system and method which shifts an information handling system lid housing portion pivot axis as the housing pivots between open and closed positions.

In accordance with the present invention, a system and method are provided which substantially reduce the disadvantages and problems associated with previous methods and systems for managing an information handling system pivot axis as the housing rotates between open and closed positions. Rotation of a housing first and second portions about a hinge is translated to a sliding movement of the hinge pivot axis to adjust a distance between first and second housing portions based upon rotational orientation. Reducing the distance between the housing portions in a closed position minimizes an appearance of a gap at the information handling system upper surface.

More specifically, a portable information handling system processes information with processing components disposed in a portable housing having a main housing portion rotationally coupled to a lid housing portion with first and second hinges. For example, the processing components include a processor that executes instructions to process information, a memory to store the instructions and information, and a display to present the information as visual images. The first and second hinges rotate the housing portions about a pivot axis that shifts laterally forwards and backwards as the housing rotational orientation changes to adjust the distance between the housing portions. For instance, the main housing portion has a full housing height at the rear side of the housing to help promote rejection of excess thermal energy from the housing and a forward extended upper side from the rear of the housing to a midpoint at which the lid housing portion rear side meets the main housing portion along a seam. The hinge pivot axis shifts rearward as the housing rotates to a closed position to minimize the size of the seam and shifts forward as the housing rotates to an open position to ensure adequate space for passage of the lid housing portion by the main housing portion forward extended upper side. In one example embodiment, the hinge has a base coupled to the main housing portion that slidingly engages a main body supporting a rack and pinion gear assembly. For instance, a gear integrated with a bracket coupled to the lid housing portion engages a pinion gear of the main body to translate bracket rotation to the main body through a rack gear integrated in the base and engaged with the pinion gear. A torque element may provide friction that resists hinge rotation by working against the bracket gear, the pinion gear and/or sliding members of the base that engage with the main body.

The present invention provides a number of important technical advantages. One example of an important technical advantage is that an information handling system portable housing having a seam between housing portions minimizes the size of the seam by sliding the hinge rotation axis as the housing opens and closes. Sliding the pivot axis of the hinge to reduce the distance between housing portions as the hinge closes the housing reduces the seam between the housing portions for a more aesthetically pleasing appearance. Having the seam between the housing portions disposed at the housing upper surface provides the full housing height at the rear of the housing for providing space for a thermal solution. The pivot axis hinge has a robust structure that survives repeated usage cycles with minimal housing wobble in response to torsion operating on the housing as the housing portions rotate.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 depicts a side perspective view of a pivot hinge configured to slide a rotational axis as the hinge rotational orientation changes;

DETAILED DESCRIPTION

A portable information handling system rotationally couples housing portions with a pivot hinge that shifts its rotational axis position as the housing portion rotational orientation changes. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
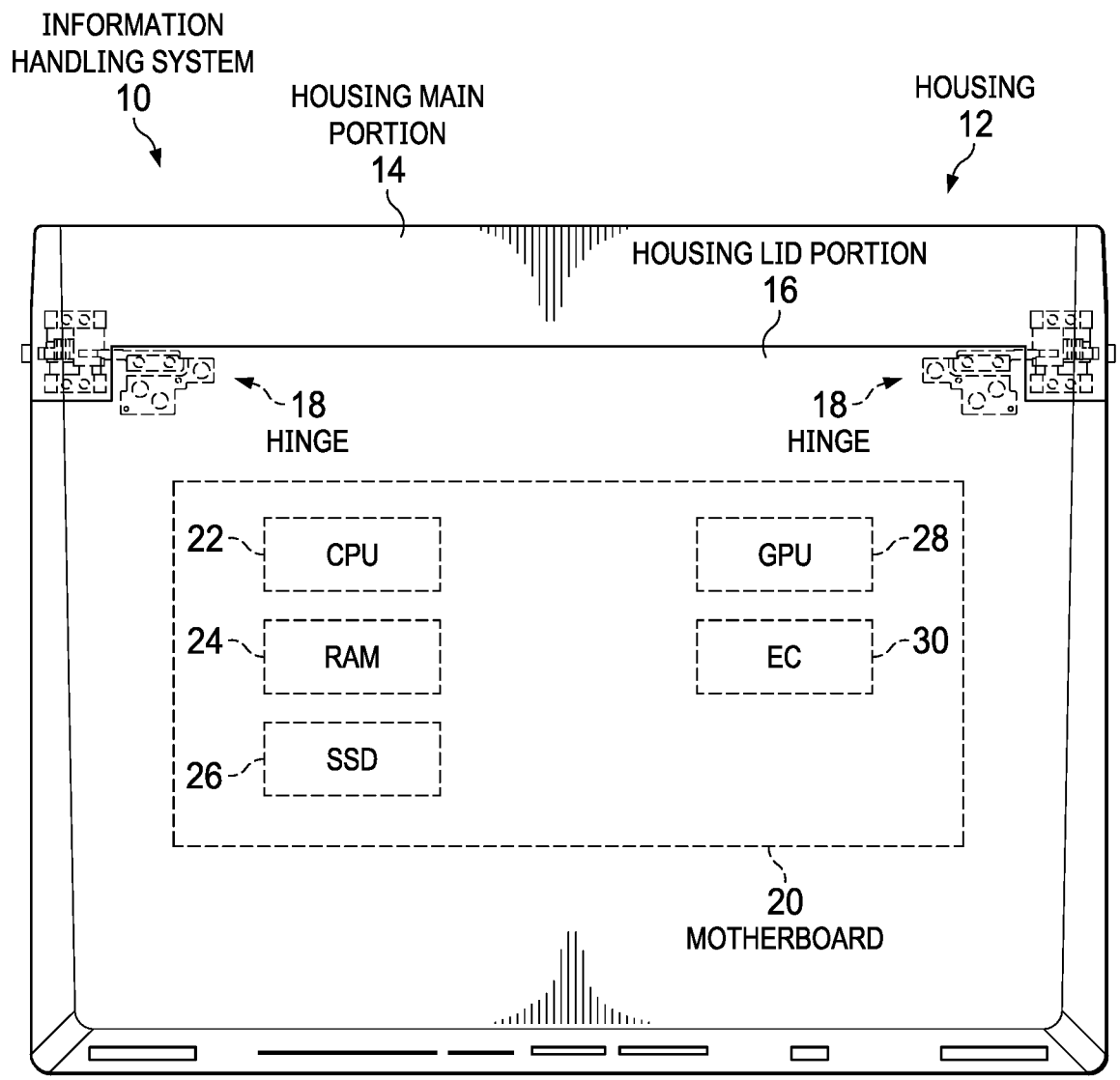
FIG. 1 depicts an upper view of a portable information handling system having a housing with a seam between housing portions at a midpoint location.

Referring now to FIG. 1, an upper view depicts a portable information handling system 10 having a housing 12 with a seam between housing portions at a midpoint location. In the example embodiment, a main housing portion 14 acts as a base of information handling system 10, and a lid housing portion 16 rotationally couples to main housing portion 14 with hinges 18 that rotate lid housing portion 16 between open and closed positions. The example main housing portion 14 has a forward extended upper side that couples to hinges 18 and defines a seam along the upper side of housing 12 where the forward extended upper side meets the lid housing portion rear side. A motherboard 20 couples in main housing portion 14 to support interfacing of processing components that cooperate to process information. For instance, a central processing unit (CPU) 22 executes instructions to process information, such as instructions of an operating system and applications. A random access memory (RAM) 24 stores the instructions and information to support CPU 22 operations. A solid state drive (SSD) 26 or other type of persistent non-transitory memory stores the instructions and information in power off states for recall to RAM 24 at power up. A graphics processing unit (GPU) 28 interfaces with CPU 22 and processes the information to generate visual images for presentation at a display integrated in lid housing portion 16, such as defining the visual image as pixel values. An embedded controller 30 manages operations of the information handling system at a physical level, such as the application of power, the maintenance of thermal constraints and interactions with peripheral devices.

Portable information handling system 10 has a forward extended upper side of main housing portion 14 so that the rear side of main housing portion 14 has the full housing height to include thermal energy management components, such as a cooling fan and venting. One difficulty with this approach is that a seam is defined at the upper surface of housing 12 where main housing portion 14 meets lid housing portion 16. The seam has to provide a sufficient distance between main housing portion 14 and lid housing portion 16 so that rotation about hinges 18 does not bind at the intersection of the housing portions. However, an excess seam distance is unsightly. To minimize the seam distance, hinges 18 slide the pivot axis for housing rotation forward as the housing rotates from a closed to an open position, thereby avoiding binding of the main and lid housing portions. Each hinge translates the pivot point as it opens and closes to provide clearance for the hinge up assembly to the base as it opens and minimize the gap at the upper surface of housing 12 when it closes. As is described in greater detail below, the pivot axis forward and rearward movement is accomplished with a rack and pinion gear mechanism that includes a torque element to manage hinge rotation and a defined rotational movement, such as between a closed position to a 135 degree open position.

Figure 2:
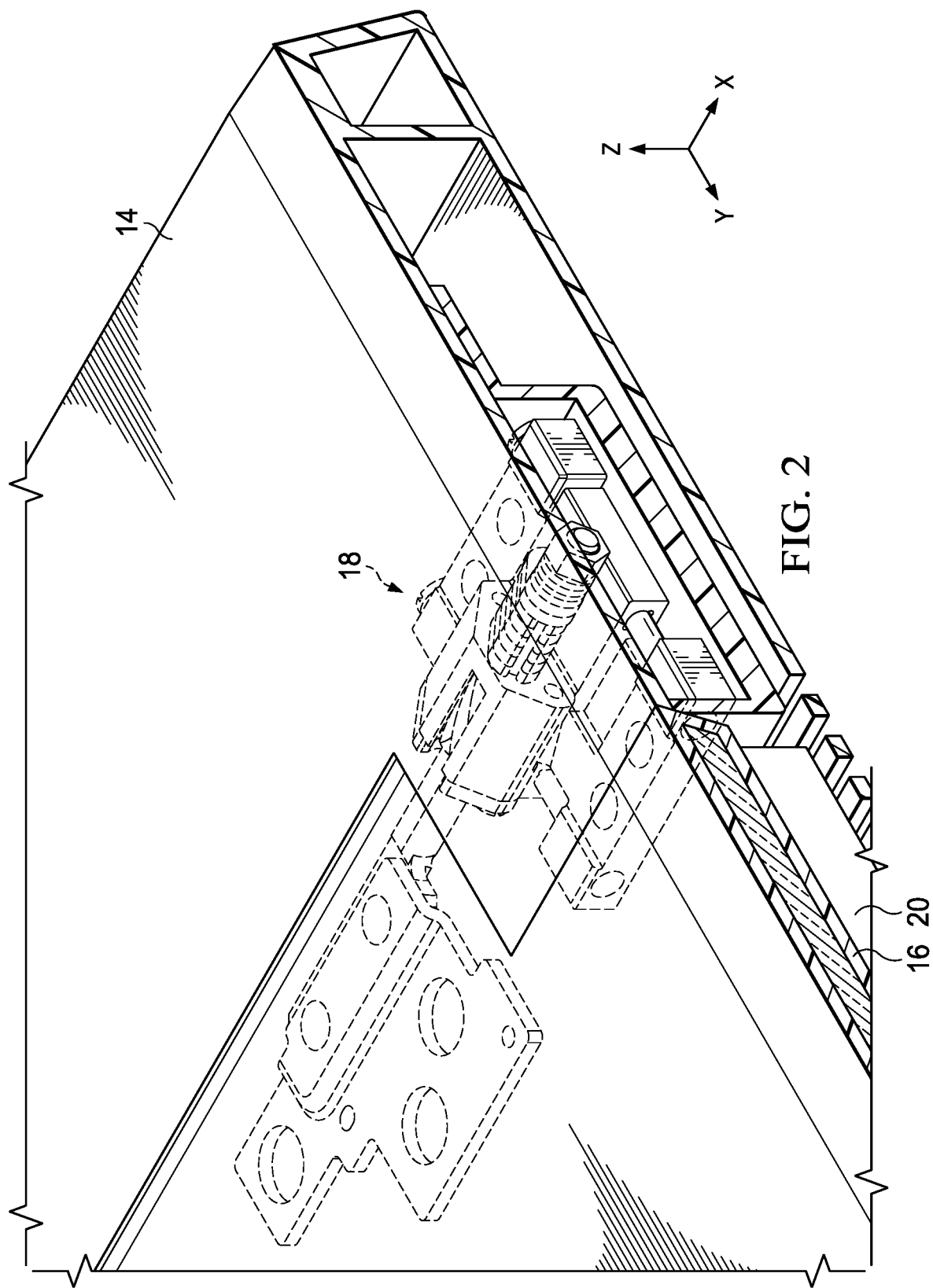
FIG. 2 depicts a side perspective sectional view of the housing having a pivot axis hinge to manage the seam distance between the housing portions.

Referring now to FIG. 2, a side perspective sectional view of the housing 12 depicts a pivot axis hinge 18 to manage the seam distance between the housing portions. In the example embodiment, main housing portion 14 at the rear side of housing 12 has the full Z-height available to manage thermal energy rejection from the system out the rear side of housing 12. Hinge 18 couples to an upper surface of main housing portion 14 along a perimeter of housing 12 with a bracket extending inward to couple with lid housing portion 16. Hinge 18 is disposed at the upper surface of main housing portion 14 with motherboard 20 coupled within main housing portion 14 below. In the example embodiment, hinge 18 is positioned over an extension by main housing portion 14 into the rear side of lid housing portion 16 to align the hinge bracket with the seam defined by the meeting of the rear side of lid housing portion 16 and the forward extended upper side of main housing portion 14. In the closed position as depicted by FIG. 2, the proximity of the pivot axis of hinge 18 to the seam helps to reduce the distance between the housing portions at the seam. As is shown in greater detail below, coupling hinge 18 at the location of the seam allows forward sliding motion of the hinge to move the hinge pivot so as to provide clearance for rotation of the housing portions from the closed to the open position.

Figure 3A:
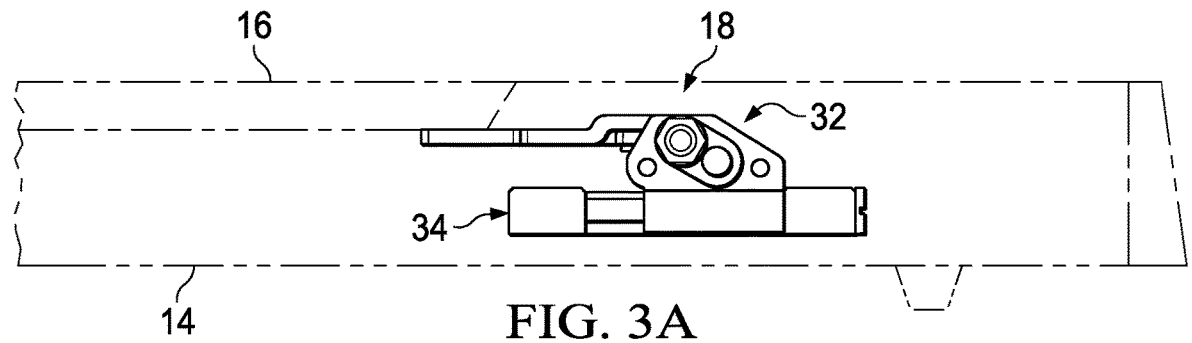
FIGS. 3A, 3B, 3C and 3D depict a portable information handling system having a pivot hinge sliding from a rearward to a forward position as the housing rotates from a closed to an open position.
Figure 3B:
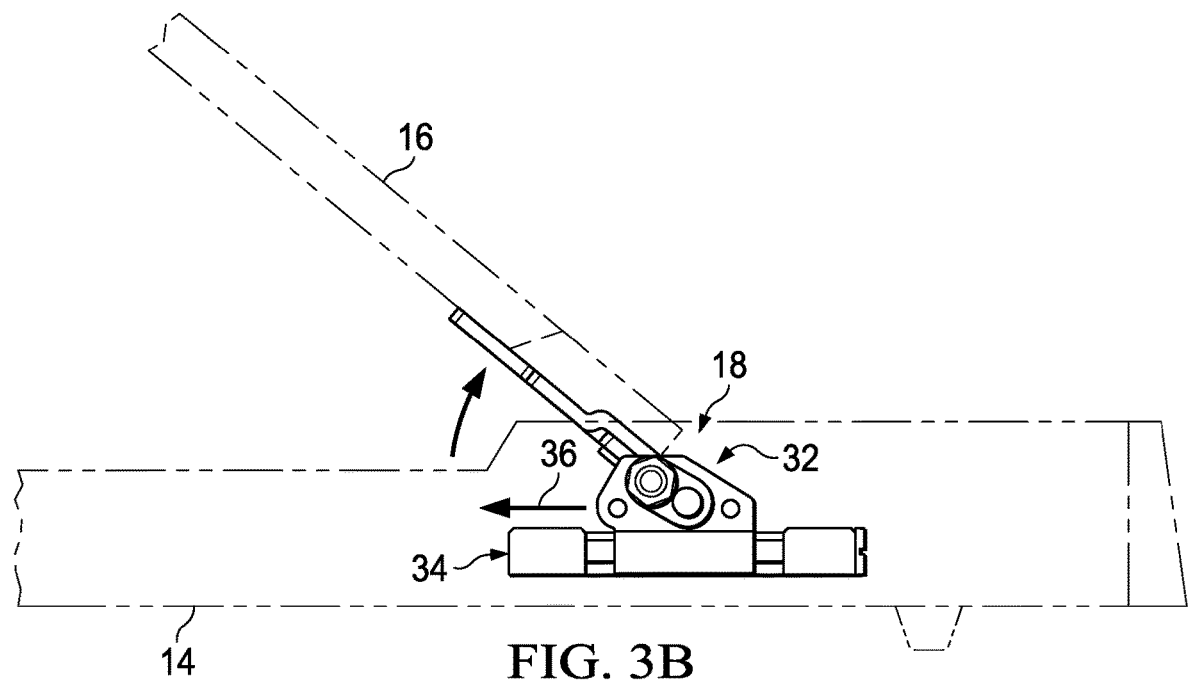
Figure 3C:
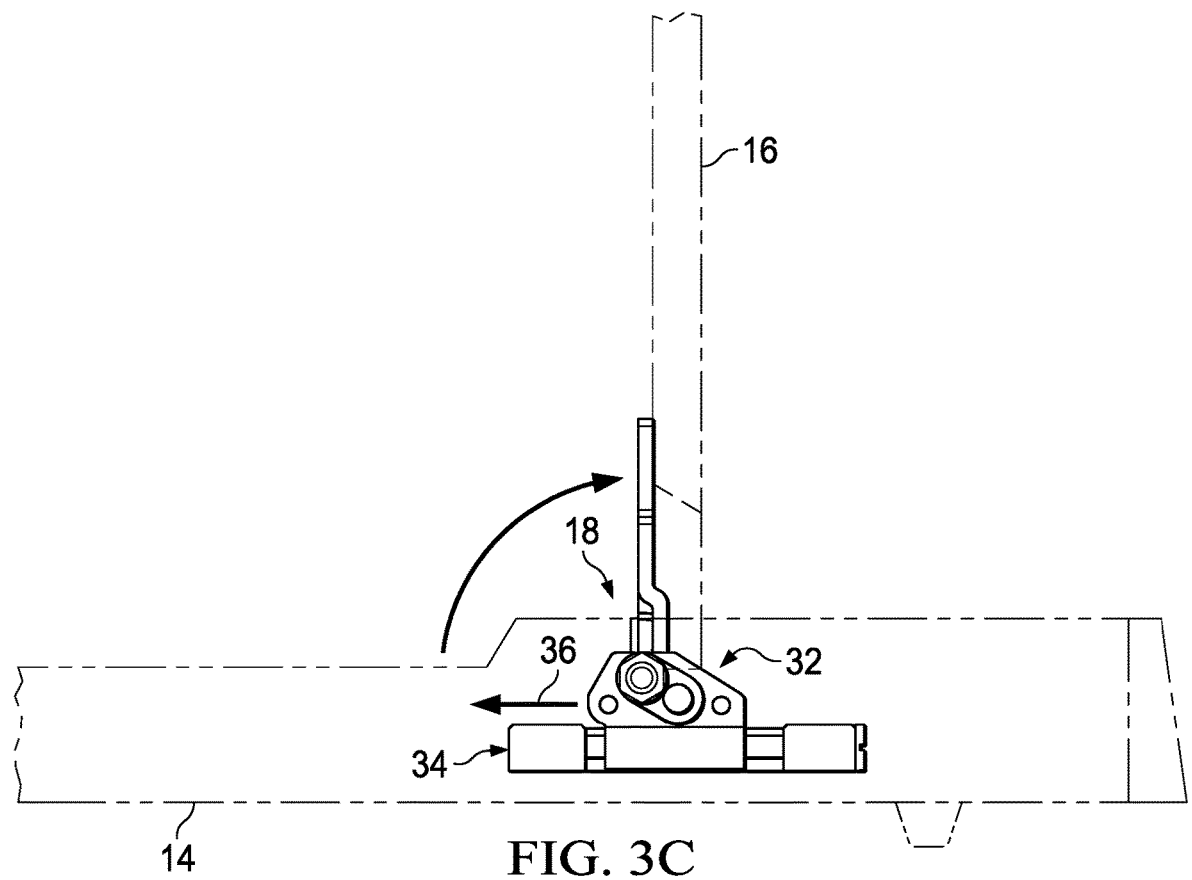
Figure 3D:
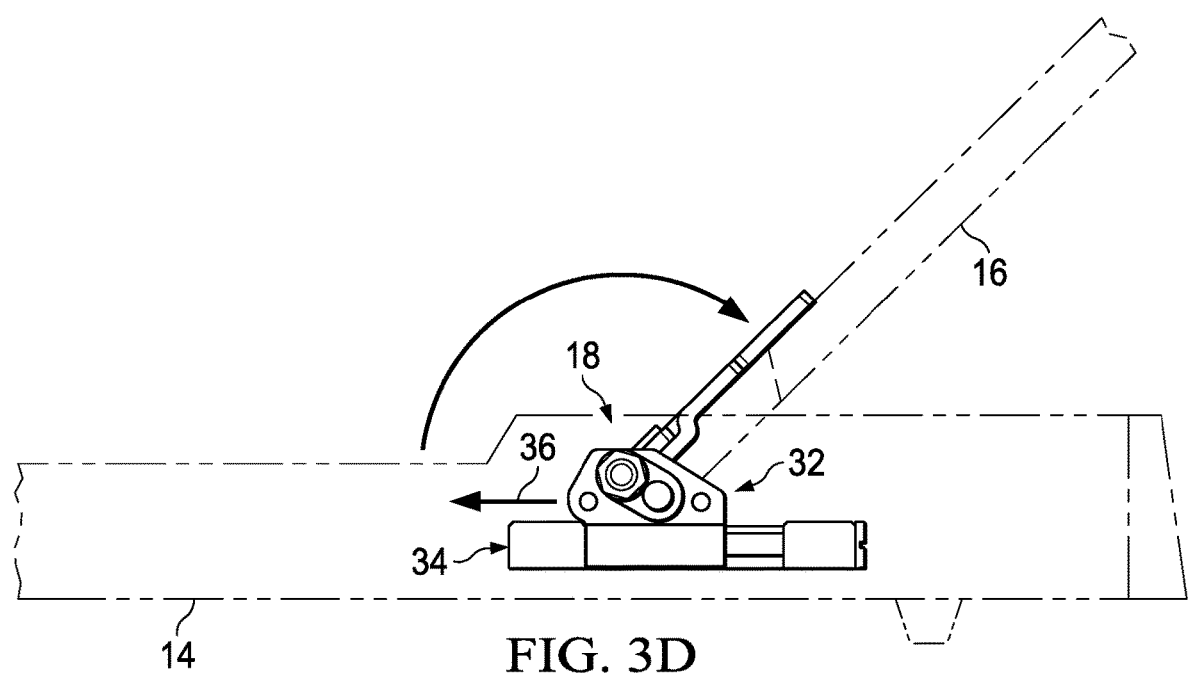

Referring now to FIGS. 3A, 3B, 3C and 3D, a portable information handling system is depicted having a pivot hinge 18 sliding from a rearward to a forward position as the housing 12 rotates from a closed to an open position. FIG. 3A depicts housing 12 in a closed position having lid housing portion 16 closed over top of main housing portion 14 with hinge 18 having a gear assembly 32 in a rearward position relative to a base assembly 34 so that the rotational axis of hinge 18 minimizes the distance between main housing portion 14 and lid housing portion 16. FIG. 3B depicts lid housing portion 16 rotating upward and away from main housing portion 14 about hinge 18, such as to expose a display integrated in the bottom surface of lid housing portion 16 and a keyboard integrated in the upper surface of main housing portion 14. As lid housing portion 16 rotates upward, hinge 18 gear assembly 32 slides forward relative to base assembly 34 as indicated by arrow 36 to increase the distance between lid housing portion 16 and main housing portion 14, thereby providing clearance for the rotation from the closed towards the open position. The forward sliding motion of gear assembly 32 has the effect of moving the pivot axis of hinge 18 forward as the rotational orientation of the lid and main housing portions increase. FIG. 3C depicts a housing rotational orientation of approximately 90 degrees where a display in lid housing portion 16 is held substantially perpendicular to a keyboard in the upper surface of main housing portion 14. FIG. 3D depicts a rotation of approximately 135 degrees of lid housing portion 16 relative to main housing portion 14 with gear assembly 32 slid fully forward in base assembly 34. In the example embodiment, the rotational range of the housing is defined by the amount of sliding permitted for gear assembly 32 within base assembly 34, which provides a defined rotational range that does not involve any physical contact of the housing portions at a rotational limiter. Rotation of lid housing portion 16 from the fully open position depicted by FIG. 3D to the closed position depicted by FIG. 3A translates rotation about hinge 18 that slides gear assembly 32 in the opposite direction relative to base assembly 34, thereby decreasing the distance between the housing portions as the closed position approaches to minimize the gap along the seam between the housing portions in the closed position.

Referring now to FIG. 4, a side perspective view depicts a pivot hinge 18 configured to slide a rotational axis as the hinge rotational orientation changes. In the example embodiment, a base assembly 34 couples in a fixed location relative to a first housing portion and a gear assembly 32 slides relative to base assembly 34 to move the rotational axis of a bracket 46 that couples to a second housing portion. Bracket 46 has an axle 44 with a bracket gear 50 that rotates as bracket 46 rotates responsive to movement of a housing portion coupled to bracket 46. Bracket gear 50 engages with a rack and pinion gear assembly 48 integrated in a main body 42 of gear assembly 32 and configured to slide main body 42 along sliding members 40 that pass through main body 42. The parallel sliding members provide stability for the translating bracket that attaches the rotational shaft, such as by maintaining a sliding path for the translating bracket in the presence of torsional forces. A base 38 of base assembly 34 has sliding members 40 coupled across a central opening 41 (labeled in FIG. 6) that provides room for sliding movement of main body 42. For example, the forward and rearward sides of the perimeter of the opening of base 38 limit the sliding movement of main body 42. A torque element 52 couples to axle 44 of bracket 46 to resist rotation of bracket 46. Torque element 52 in the example embodiment also couples with rack and pinion assembly 48 to distribute resistance to rotation across gear assembly 32 for a more regulated feel. For example, the torque distribution is approximately 70% coupled to the bracket and 30% coupled to the pinion to ensure the strength of the gears in the drive mechanism is not exceeded. In an alternative embodiment, a torque element may provide resistance to sliding motion of main body 42 along sliding member 40, such as by compression against sliding members 40 from torque elements coupled at main body 42.

Figure 5:
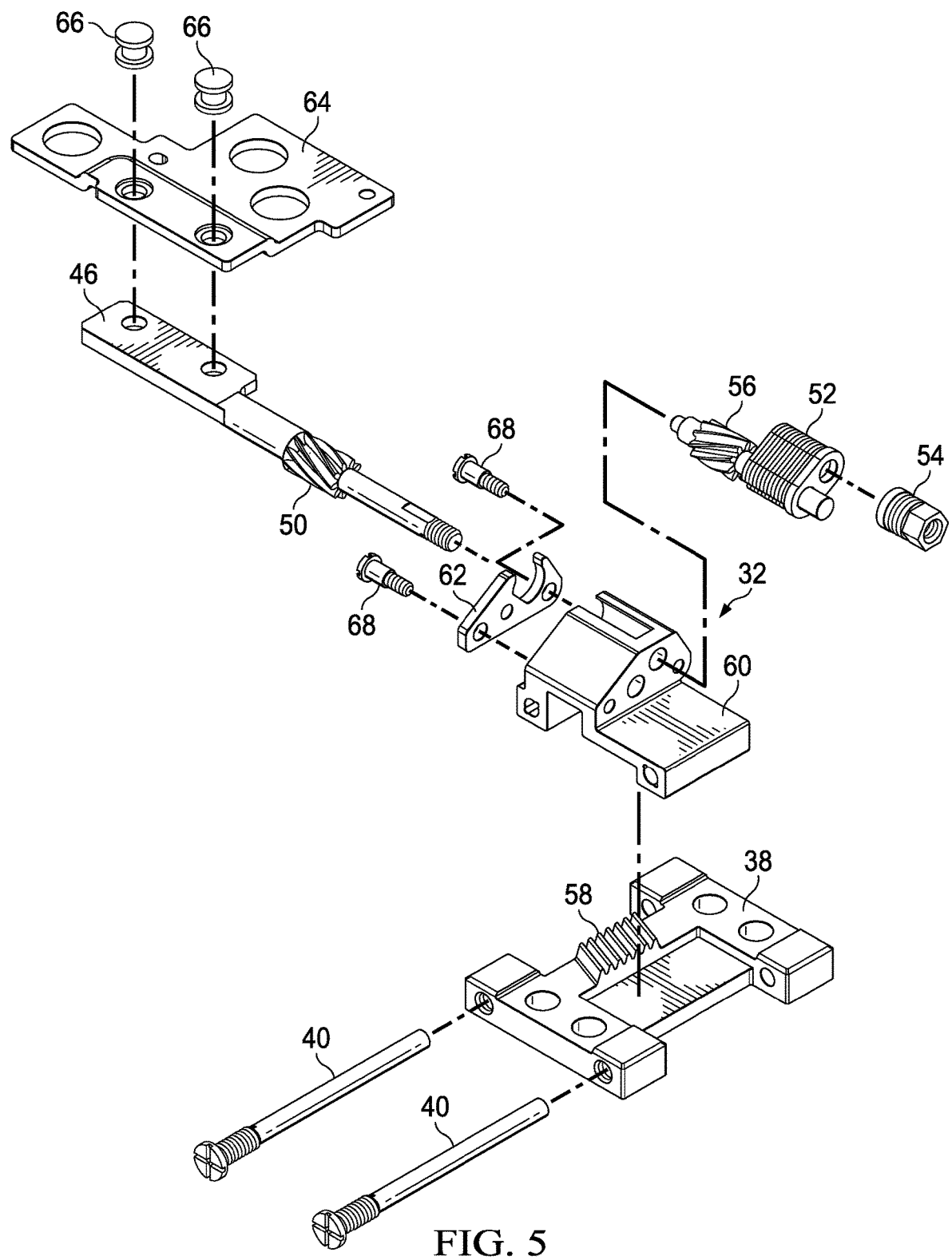
FIG. 5 depicts an exploded upper perspective view of the pivot hinge.
Figure 6:
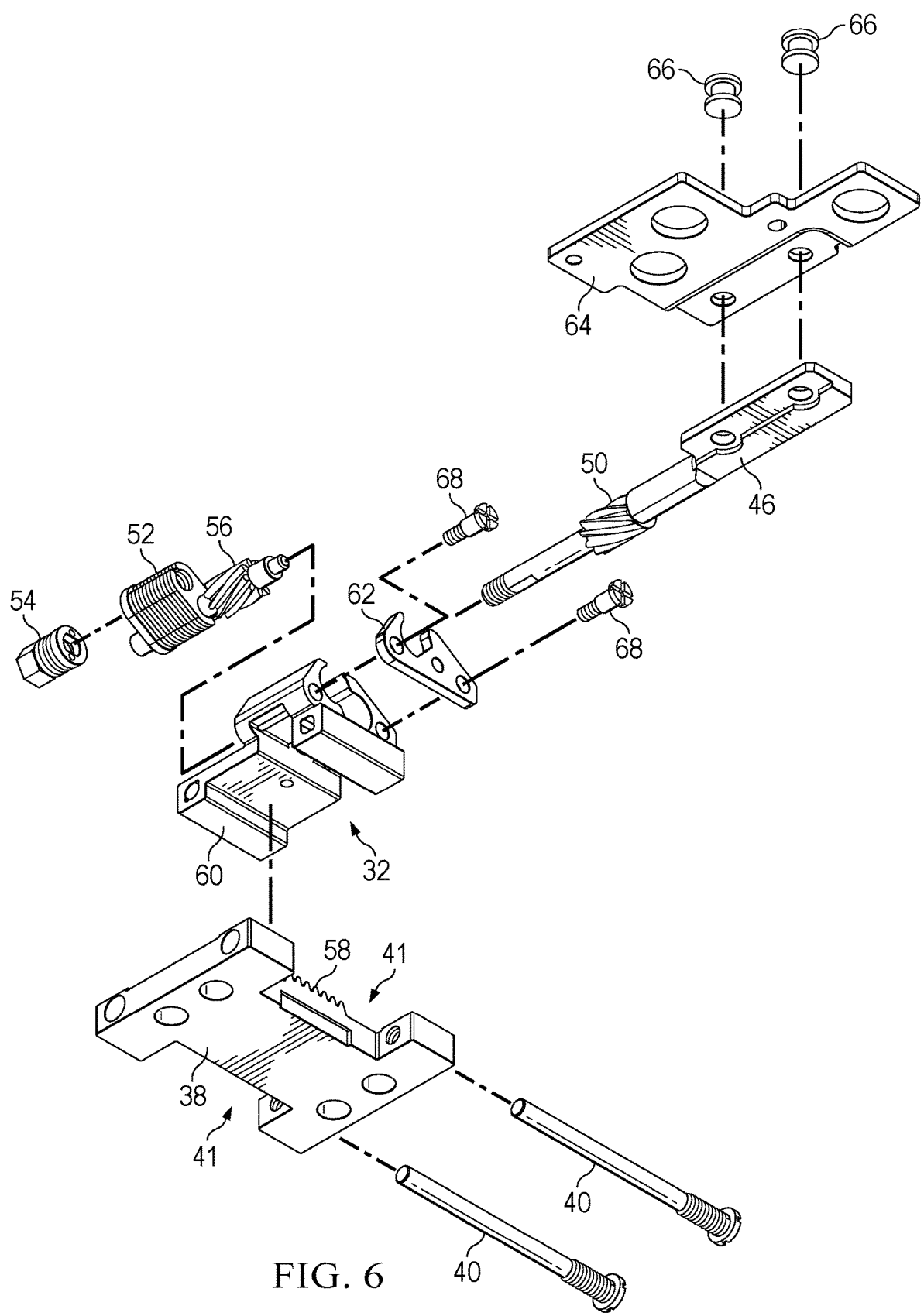
FIG. 6 depicts an exploded lower perspective view of the pivot hinge.

Referring now to FIGS. 5 and 6, exploded perspective views depict the pivot hinge 18. FIG. 5 depicts an upper and lower exploded view of pivot hinge 18 and FIG. 6 depicts a lower exploded view of pivot hinge 18. FIGS. 4, 5 and 6 depict a pivot hinge 18 configured to couple to a right side of a main housing portion having the bracket 46 directed inwards towards a central position of the housing. In contrast, FIG. 3 depicts a pivot hinge configured to couple to a left and right side of a main housing portion with the bracket 46 on each hinge directed inwards when hinge 18 couples to the main housing portion at a left and right side. Although the bracket of each hinge 18 is disposed at an opposing side, the structure that holds the bracket in place and adjusts the pivot axis of the bracket is similar for each hinge with a symmetrical opposite construction.

Base 38 is configured to couple to a fixed location of a main housing portion and integrates a rack gear 58 that aligns to engage with a pinion gear 56 coupled within the main body housing 60, which aligns pinion gear 56 to engage with bracket gear 50. Main body housing 60 and coupling element 62 hold the gear assembly 32 in an engaged state so that rotation of bracket 46 translates through pinion gear 56 to rack gear 58 and results in a sliding motion of main body housing 60 relative to base 38. Sliding members 40 are threaded pins that engage with base 38 and insert through openings of main body housing 60 to support the sliding motion. Coupling element 62 couples to main body housing 60 with screws 68 to hold bracket 46 in place and having bracket gear 50 engaged with pinion gear 56. In the example, a housing bracket plate 64 couples with rivets 66 to bracket 46 for additional structural support. Although the example embodiment integrates rack gear 58 with base 38, alternative embodiments may arrange the rack, pinion gear and bracket gear in alternative ways to achieve the desired sliding of axis about which bracket 46 rotates, such as integrating the rack in main body housing 60.

Although the present invention has been described in detail, it should be understood that various changes, substitutions and alterations can be made hereto without departing from the spirit and scope of the invention as defined by the appended claims.

What is claimed is:

1. An information handling system comprising:
a housing having a lid housing portion and a main housing portion, the lid housing portion having a rear side aligned with a forward extended upper side of the main housing portion;
a processor disposed in the main housing and operable to execute instructions to process information;
a memory disposed in the main housing and interfaced with the processor, the memory operable to store the instructions and information;
a display integrated in the lid housing portion and interfaced with the processor, the display operable to present the information as visual images; and
a hinge having a base fixedly coupled to the main housing portion, having a bracket integrated with an axle having a bracket gear, the bracket coupled to the lid housing portion, and having a gear assembly coupling the base and bracket to translate rotation of the bracket about an axis into sliding of the gear assembly to adjust a distance between the lid housing portion rear side and the main housing portion forward extended upper side, the gear assembly including a rack gear integrated in an upper surface of the base fixed in position relative to the base and main housing portion and a main body coupled to the base by a sliding member, the main body having a pinion gear and the bracket gear engaged with the rack gear, the bracket gear rotating around the axis and directly engaged with the rack gear from above the base upper side, the main body configured to slide along a sliding member within a central opening located at each side of the base, the central opening defining a range of sliding movement to adjust the distance.

2. The information handling system of claim 1 wherein the bracket gear integrated with the bracket indirectly engages the pinion gear and the rack.

3. The information handling system of claim 2 wherein first and second parallel sliding members couple to the base across the central opening and engage with the main body, the first and second parallel sliding members stabilizing the main body coupled with the bracket.

4. The information handling system of claim 3 further comprising a torque element coupling to the pinion gear to resist rotation of the bracket.

5. The information handling system of claim 4 wherein the torque element further couples the pinion gear against the main body to resist rotation of the pinion gear.

6. The information handling system of claim 1 wherein:
translation of the bracket to move the lid housing portion from the closed position towards the open position slides the sliding member forward to move the lid housing portion rear side away from the main housing portion forward extended upper side; and
translation of the bracket to move the lid housing portion from the open position towards the closed position slides the sliding member rearward to move the lid housing portion rear side towards the main housing portion forward extended upper side.

7. The information handling system of claim 6 wherein the hinge couples to the main housing portion to have the main body at the housing perimeter and the bracket directed toward the housing interior.

8. An information handling system comprising:
a housing having a main portion and a lid portion;
a processor disposed in the housing and operable to execute instructions to process information;
a memory disposed in the housing and interfaced with the processor, the memory operable to store the instructions and information; and
a hinge rotationally coupling the main and lid portions to rotate about an axis, the hinge comprising:
a base coupled in a fixed position to the main housing portion;
a sliding member coupled to the base;
a main body slidingly engaged on the sliding member;
a bracket having an axle and a bracket gear aligned to rotate about the axis, the bracket coupled to the lid housing portion; and
a rack gear integrated in the base to have a fixed position relative to the main housing portion and exposed at an upper surface of the base, the bracket gear directly engaging the rack gear from above the rack gear to translate rotation of the axle into sliding of the main body so that the housing lid portion slides relative to the housing main portion.

9. The hinge of claim 8 further comprising first and second sliding members coupled to the base in a parallel relationship and each passing through an opening of the main body.

10. The hinge of claim 9 further comprising a torque element coupled to the bracket to resist rotation of the bracket.

11. The hinge of claim 9 further comprising a torque element coupled to a pinion gear to resist sliding movement of the main body relative to the base, the pinion gear engaged with the bracket gear.

* * * * *